United States Patent
Li

(10) Patent No.: US 10,078,567 B2
(45) Date of Patent: Sep. 18, 2018

(54) IMPLEMENTING FAULT TOLERANCE IN COMPUTER SYSTEM MEMORY

(71) Applicant: Alibaba Group Holding Limited, Georgetown, Grand Cayman (KY)

(72) Inventor: Shu Li, Santa Clara, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 67 days.

(21) Appl. No.: 15/074,869

(22) Filed: Mar. 18, 2016

(65) Prior Publication Data

US 2017/0270017 A1   Sep. 21, 2017

(51) Int. Cl.
| G06F 11/00 | (2006.01) |
| G06F 11/20 | (2006.01) |
| G06F 11/07 | (2006.01) |
| G06F 12/1027 | (2016.01) |
| G06F 11/10 | (2006.01) |

(52) U.S. Cl.
CPC ........ *G06F 11/2094* (2013.01); *G06F 11/076* (2013.01); *G06F 11/079* (2013.01); *G06F 11/0727* (2013.01); *G06F 11/1076* (2013.01); *G06F 12/1027* (2013.01); *G06F 2201/805* (2013.01); *G06F 2212/1032* (2013.01); *G06F 2212/657* (2013.01)

(58) Field of Classification Search
CPC .......................... G06F 11/2094; G06F 11/1004
See application file for complete search history.

(56) References Cited

U.S. PATENT DOCUMENTS

| 4,774,659 | A | 9/1988 | Smith et al. |
| 5,117,350 | A | 5/1992 | Parrish et al. |
| 5,278,961 | A | 1/1994 | Mueller |
| 5,974,544 | A | 10/1999 | Jeffries et al. |
| 7,478,285 | B2 * | 1/2009 | Fouquet-Lapar ...... G11C 29/44 365/201 |
| 7,526,692 | B2 | 4/2009 | Borkenhagen et al. |
| 7,529,112 | B2 | 5/2009 | Dreps et al. |
| 7,562,271 | B2 | 7/2009 | Shaeffer et al. |
| 7,802,158 | B2 | 9/2010 | Borkenhagen et al. |
| 8,060,774 | B2 | 11/2011 | Smith et al. |
| 8,195,978 | B2 | 6/2012 | Flynn et al. |
| 8,281,227 | B2 | 10/2012 | Thatcher et al. |
| 8,307,258 | B2 | 11/2012 | Flynn et al. |
| 8,412,978 | B2 | 4/2013 | Flynn et al. |
| 8,495,460 | B2 | 7/2013 | Flynn et al. |

(Continued)

*Primary Examiner* — Philip A Guyton

(57) ABSTRACT

A method of implementing fault tolerance in computer memory includes translating a logical address to a first physical address for a first memory location in the computer memory. The computer memory includes redundant memory locations. A second memory location selected from the redundant memory locations is used instead of the first memory location in response to information characterizing the first memory location as faulty. Also, error correction coding (ECC) is performed at least two times on data written to the computer memory and read from the computer memory; the ECC is performed in the computer memory and outside the computer memory. Furthermore, in response to identifying a defective first pin on a memory module, an input from the defective pin is routed to a redundant second pin on the module, and an output from the second pin is routed to a destination on the memory module.

18 Claims, 8 Drawing Sheets

(56) References Cited

U.S. PATENT DOCUMENTS

| | | | |
|---|---|---|---|
| 8,495,467 B1* | 7/2013 | Billing | G11C 29/42 |
| | | | 714/764 |
| 8,539,152 B2 | 9/2013 | Shaeffer et al. | |
| 8,738,991 B2 | 5/2014 | Flynn et al. | |
| 8,934,311 B2 | 1/2015 | Yu et al. | |
| 9,058,897 B2 | 6/2015 | Yu et al. | |
| 9,086,957 B2 | 7/2015 | Cordero et al. | |
| 9,146,864 B2 | 9/2015 | Retter et al. | |
| 9,171,585 B2 | 10/2015 | Rajan et al. | |
| 2006/0023482 A1* | 2/2006 | Dreps | G11C 5/04 |
| | | | 365/63 |
| 2008/0068039 A1* | 3/2008 | Bernstein | G11C 29/006 |
| | | | 326/16 |
| 2008/0094808 A1 | 4/2008 | Kanapathippillai et al. | |
| 2008/0266990 A1 | 10/2008 | Loeffler | |
| 2009/0006886 A1 | 1/2009 | O'Connor et al. | |
| 2009/0006900 A1 | 1/2009 | Lastras-Montano et al. | |
| 2009/0276654 A1 | 5/2009 | Butterworth et al. | |
| 2009/0204750 A1 | 8/2009 | Estakhri et al. | |
| 2011/0219208 A1 | 9/2011 | Assad et al. | |
| 2013/0318362 A1 | 11/2013 | Mothilal | |
| 2014/0063983 A1 | 3/2014 | Daly | |
| 2014/0068319 A1 | 3/2014 | Daly | |
| 2015/0033002 A1 | 1/2015 | Cordero et al. | |
| 2015/0199234 A1* | 7/2015 | Choi | G11C 29/42 |
| | | | 714/764 |
| 2015/0356004 A1 | 12/2015 | Cordero et al. | |
| 2015/0380130 A1 | 12/2015 | Xue et al. | |
| 2016/0071608 A1 | 3/2016 | Bronner et al. | |

* cited by examiner

IMPLEMENTING FAULT TOLERANCE IN COMPUTER SYSTEM MEMORY

BACKGROUND

Electric or magnetic interference, e.g., background radiation, can cause a single bit of dynamic random-access memory (DRAM) to spontaneously flip to the opposite state, which is a "hard" error condition. Due to scaled-down manufacturing technologies that increase DRAM density and reduce the size of components on chips, and due to increasing processing burdens, e.g., in computation-intensive applications at data centers, memory in current computer systems can suffer significantly from interference, resulting in serious error conditions.

Current computers utilize error correction coding (ECC) based on Hamming code that corrects single-bit errors and detects double-bit errors within a codeword. That methodology hardly meets the current reliability requirements of computer memory. When error counts increase, the central processing unit (CPU) slows down the memory's performance. Consequently, the computer system's performance can be lower than 50 percent of the nominal standard.

Furthermore, manufacturers apply conventional redundancy repair, which involves testing all memory cell arrays and replacing an erroneous bitline or wordline with a redundant line, for example. But this type of redundancy repair is only applied at the beginning, before the memory is installed in a computer system. Thus, this procedure cannot solve hard errors that occur during online memory use.

In summary, current fault tolerance methods such as ECC and redundancy repair are expected to fix memory errors, but they have limited capability. Existing fault tolerance methods cannot meet the overwhelming demand at current levels of memory usage, especially levels experienced because of computation-intensive applications in data centers, for example.

SUMMARY

Embodiments according to the present invention improve computer memory performance and reliability using online redundancy repair throughout the memory's lifetime, instead of, or in addition to, redundancy repair before the memory is delivered or installed. Embodiments according to the invention also improve computer performance by correcting errors during operation. Improved fault tolerance as disclosed herein can reduce operating and maintenance costs.

In an embodiment, fault tolerance in a computer memory is implemented by translating a logical address to a first physical address for a first memory location in the computer memory. The translation uses a mapping relation that identifies memory locations in the computer memory, where the computer memory includes redundant memory locations. A second memory location in the computer memory is used to store data instead of the first memory location in response to information characterizing the first memory location as faulty. The second memory location is selected from the redundant memory locations. The first and second memory locations may be bitlines, wordlines, banks, ranks, channels, rows, columns, or devices (e.g., chips).

In an embodiment, fault tolerance in a computer memory is implemented by performing error correction coding (ECC) at least two times on data written to the computer memory and at least two times on data read from the computer memory. The ECC is performed both in the computer memory and outside the computer memory each time data is written to the computer memory and each time data is read from the computer memory. In one such embodiment, the ECC is performed once in the computer memory and once in a system-on-a-chip (SOC) that includes a central processing unit (CPU) that is coupled to the computer memory.

In an embodiment, the computer memory includes one or more memory modules, each module including one or more memory chips. In one such embodiment, the memory module is a dual in-line memory module (DIMM).

In an embodiment, fault tolerance in a computer memory is implemented by identifying a first pin characterized as defective on the memory module. The memory module includes redundant pins. In such an embodiment, an input to the first pin is rerouted to one of the redundant pins (a second pin), and an output from the second pin is routed to a destination (e.g., a memory chip) on the memory module. In an embodiment, a demultiplexer is used to reroute the input from the first pin to the second pin, and a multiplexer is used to route the output from the second pin to the destination (e.g., the memory chip).

In summary, embodiments according to the present invention improve fault tolerance using redundancy repair and robust ECC. Redundancy repair can be performed while the computer system/memory is online. Thus, the reliability, availability, and lifetime of computer memory is improved.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the detailed description, serve to explain the principles of the disclosure.

DETAILED DESCRIPTION

Figure 1:
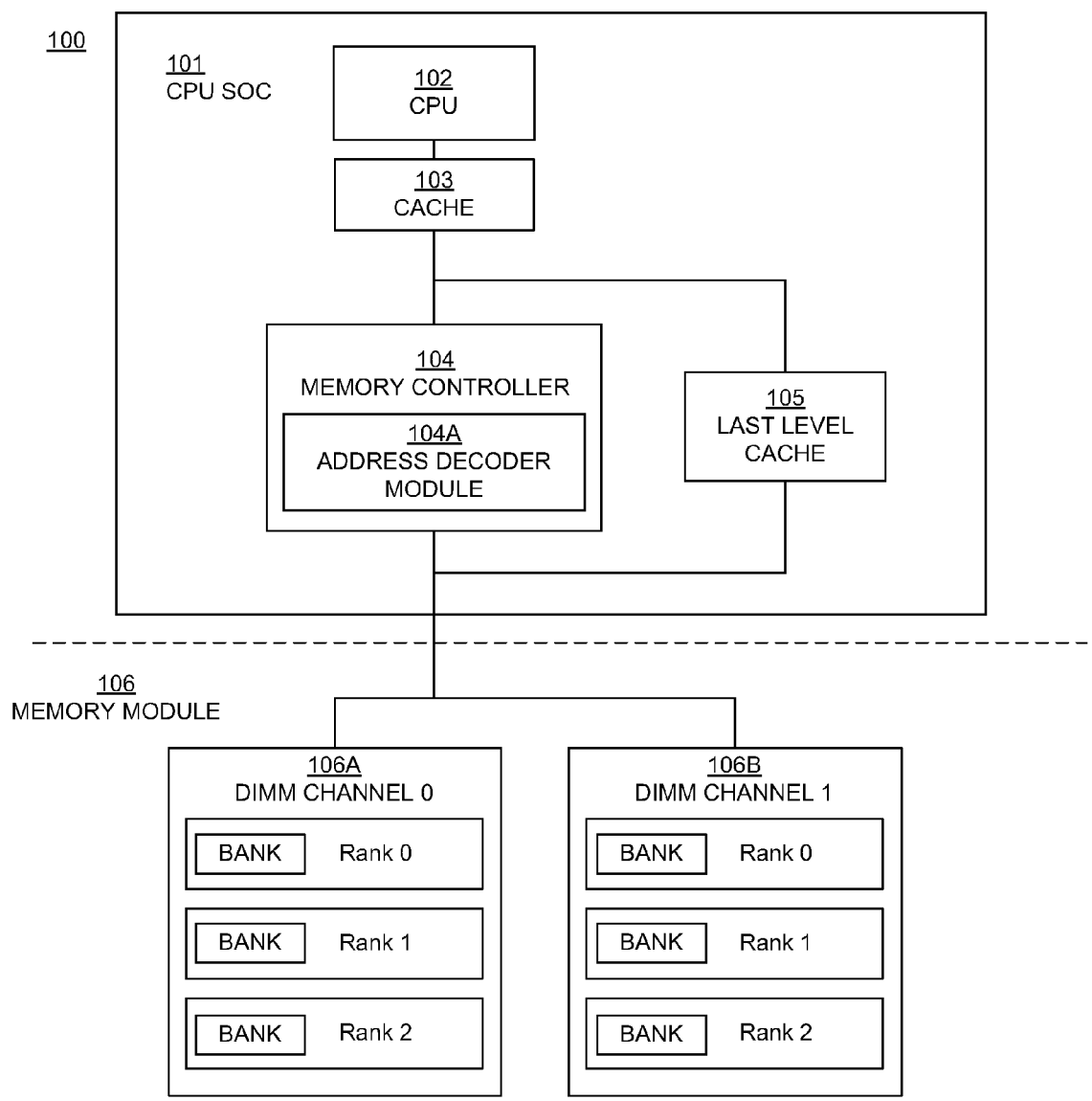
FIG. 1 is a block diagram illustrating elements of a computer system in an embodiment according to the present invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims.

Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "translating," "using," "replacing," "performing," "identifying," "routing," "rerouting," "storing," or the like, refer to steps (e.g., steps in the flowchart of FIG. 6) of a method or process (e.g., a method of implementing fault tolerance in a computer memory). A computer system or similar electronic computing device manipulates and transforms data represented as physical (electronic) quantities within memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), dynamic random access memory (DRAM), read only memory (ROM), electrically erasable programmable ROM (EEPROM), flash memory (e.g., an SSD) or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

In overview, embodiments according to the present disclosure improve the fault tolerance of computer memory such as dual in-line memory modules (DIMMs) through redundancy repair and enhanced error correction coding (ECC) with robust error correction capability. Embodiments according to the disclosure include several features such as but not limited to: (1) improved redundancy repair at the wordline or bitline level within the same DRAM chip; (2) improved redundancy repair at higher levels of the memory hierarchy (e.g., bank, rank, channel, row, column, chip); (3) a second error correction codec embedded in the memory module, which collaborates with an ECC codec residing in, for example, a memory controller that may be included in a system-on-a-chip (SOC); and (4) dynamically remapping pins on the memory module, e.g., on a DIMM, to handle, for example, deterioration of the pins (also known as gold fingers).

FIG. 1 shows an example of a computer system architecture 100 in an embodiment according to the invention. In the example of FIG. 1, caches, memory, and a memory controller are depicted. In the example of FIG. 1, the architecture 100 includes a central processing unit system-on-a-chip (CPU SOC) 101 and a number of (one or more) memory modules exemplified by the memory module 106. In the example of FIG. 1, a single dual-channel memory module (e.g., a DIMM) is shown. There can be additional CPU SOCs coupled to the CPU SOC 101, with each of those CPU SOCs respectively coupled to one or more memory modules. As used herein, a memory module is a memory board that includes a number of memory chips where, for example, a memory chip may be a DRAM chip.

Figure 2:
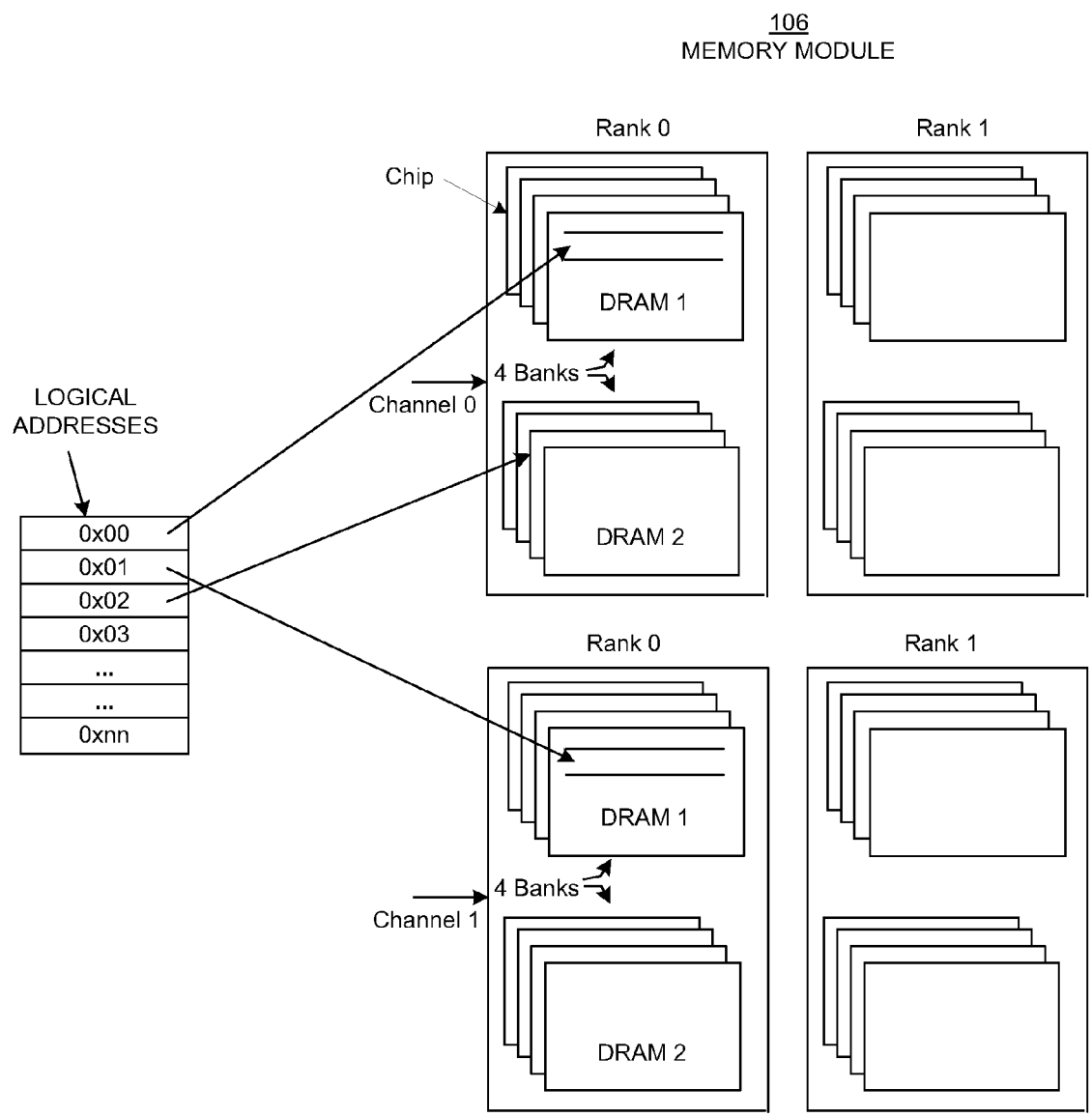
FIG. 2 is a block diagram showing memory address mapping in a memory architecture hierarchy in an embodiment according to the present invention.

The CPU SOC 101 includes, but is not limited to, the CPU 102, the cache 103, the memory controller 104, and the last level cache 105. The memory controller 104 includes, but is not limited to, the address decoder module 104A. The memory module 106 includes, but is not limited to, DIMM channel 0 106A and DIMM channel 1 106B. A memory module may be organized as a hierarchy of channels, ranks, devices, banks, rows, and columns. The hierarchy is shown in FIG. 2.

The address decoder module 104A of FIG. 1 translates the logical addresses into physical addresses. In the FIG. 2 embodiment, a physical address includes a channel identifier (ID), a rank ID, a bank ID, a row number, and a column number. Based on the physical address, a memory location in the memory module 106 is uniquely identified. This physical address and logical address mapping is used for improved fault tolerance as will be described.

Based on daily monitoring and data statistics, memory failure information can be recorded, tabulated, categorized, and analyzed. Table 1 below shows examples of types of fault patterns in memory and the corresponding probability.

TABLE 1

Memory Fault Pattern and Fault Rate Analysis

| Failure Pattern | % Faulty Nodes |
|---|---|
| 1 Bit | 47.6 |
| 2 Bits | 0.7 |
| 3 Bits | 0.05 |
| 1 Word | 2.4 |
| 2 Words | 0.3 |
| 3 Words | 0.1 |
| 1 Column | 10.5 |
| 1 Row | 12.0 |
| 1 Bank | 16.2 |
| 1 DRAM | 2.4 |
| 2 Columns | 0.5 |
| 2 Rows | 0.9 |
| 1 Lane | 4.8 |
| 1 Rank | 0.2 |
| 2 DRAMS | 1.1 |
| 1 Channel | 0.1 |
| 1 Node | 0.4 |

According to the information in Table 1, the errors with higher probabilities are those that occur on one (1) bit, 1 column, 1 lane, 1 row, 1 word, and 1 DRAM. The common point is the number "1," which means that a single point error is dominant in memory. Embodiments according to the invention effectively solve problems related to different types of memory faults including those presented above.

The logical address associated with a memory error can be reported to and may be recorded by the memory controller 104. The memory controller 104 translates that logical address to retrieve the physical address of the error.

As mentioned above, embodiments according to the invention include several features including improved redundancy repair at the wordline or bitline level within the same memory chip and improved redundancy repair at higher levels of the memory hierarchy (e.g., row, column, bank, chip, rank, channel). More specifically, in an embodiment, a memory module includes redundant memory locations (e.g., redundant wordlines and redundant bitlines). A redundant memory location is a term well-known in the art. Redundant memory locations have physical addresses not included in the mapping relation between physical and logical addresses; that is, a redundant memory location is held in reserve and a logical address is not mapped to it until it is used for redundancy repair.

Embodiments according to the invention use the redundant wordlines and bitlines to replace faulty wordlines and faulty bitlines, respectively. The replacement of a faulty bitline or wordline with a redundant one is referred to herein as wordline or bitline redundancy repair.

Wordline and bitline redundancy repairs can be performed offline or online. Offline redundancy repairs are performed by removing the memory module (e.g., DIMM) from the computer system (e.g., a server), performing the repair, and then reinserting the memory module back into the computer system. Online redundancy repairs are performed with the memory module in place in the computer system, and can be performed without shutting down the computer system.

In an embodiment, offline wordline or bitline repair includes the following steps. First, the physical address of a memory error is determined. This information can be provided by the vendor, for example. Once the physical address of the error location is known, then a redundancy repair interface on the memory controller 104, for example, can be used to implement the redundancy repair. For example, the memory controller 104 may make the location of the wordline or bitline that includes the error location not selectable, while making the replacement wordline or bitline selectable. The memory module design can also be modified to accommodate the replacement of a wordline/bitline with a redundant wordline/bitline. For example, the data lines in the memory module can be modified so that they no longer connect to the erroneous wordline/bitline. In general, offline repairs can include modifications to the control logic and control software and/or modifications to the memory module hardware.

Figure 3A:
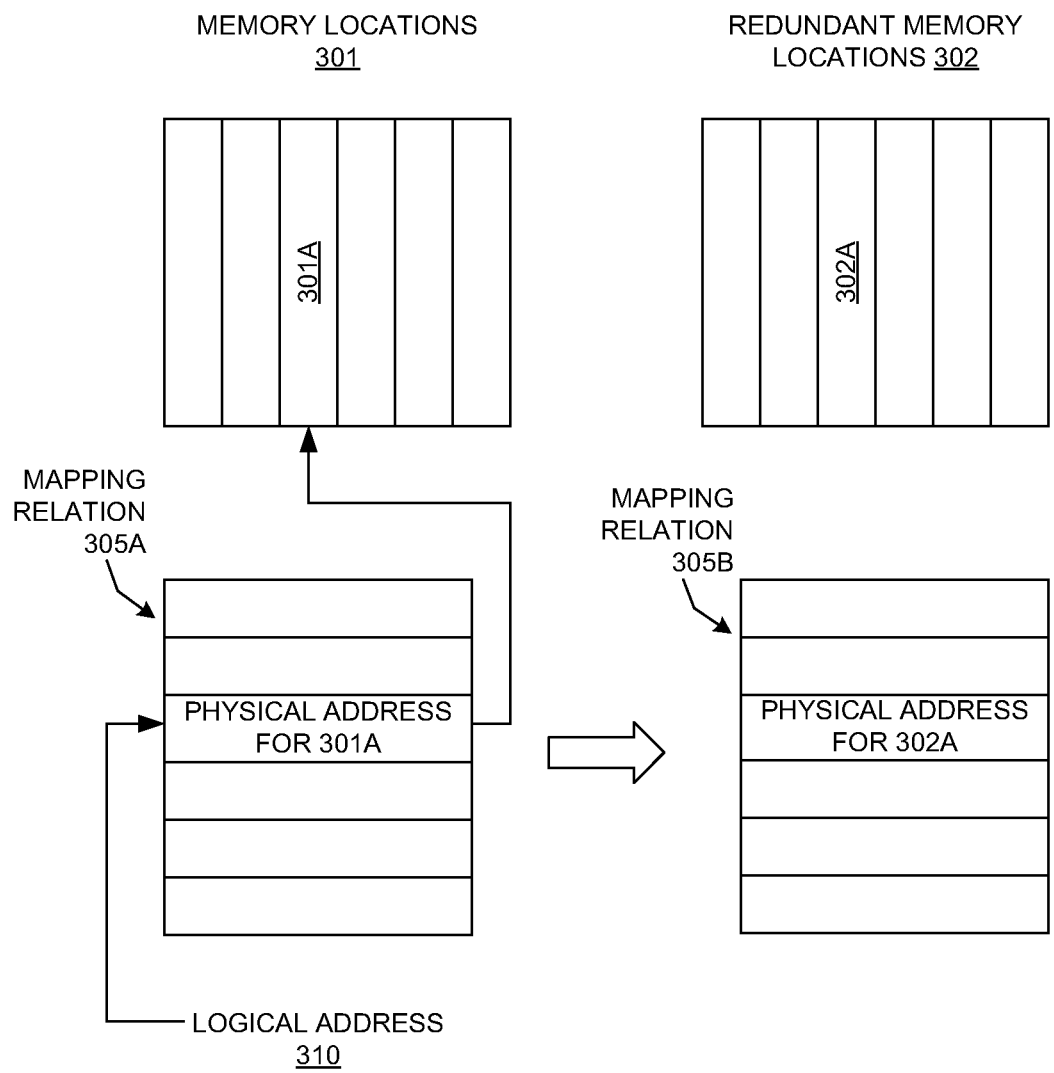
FIGS. 3A and 3B are block diagrams showing an example of online redundancy repair in an embodiment according to the present invention.
Figure 3B:
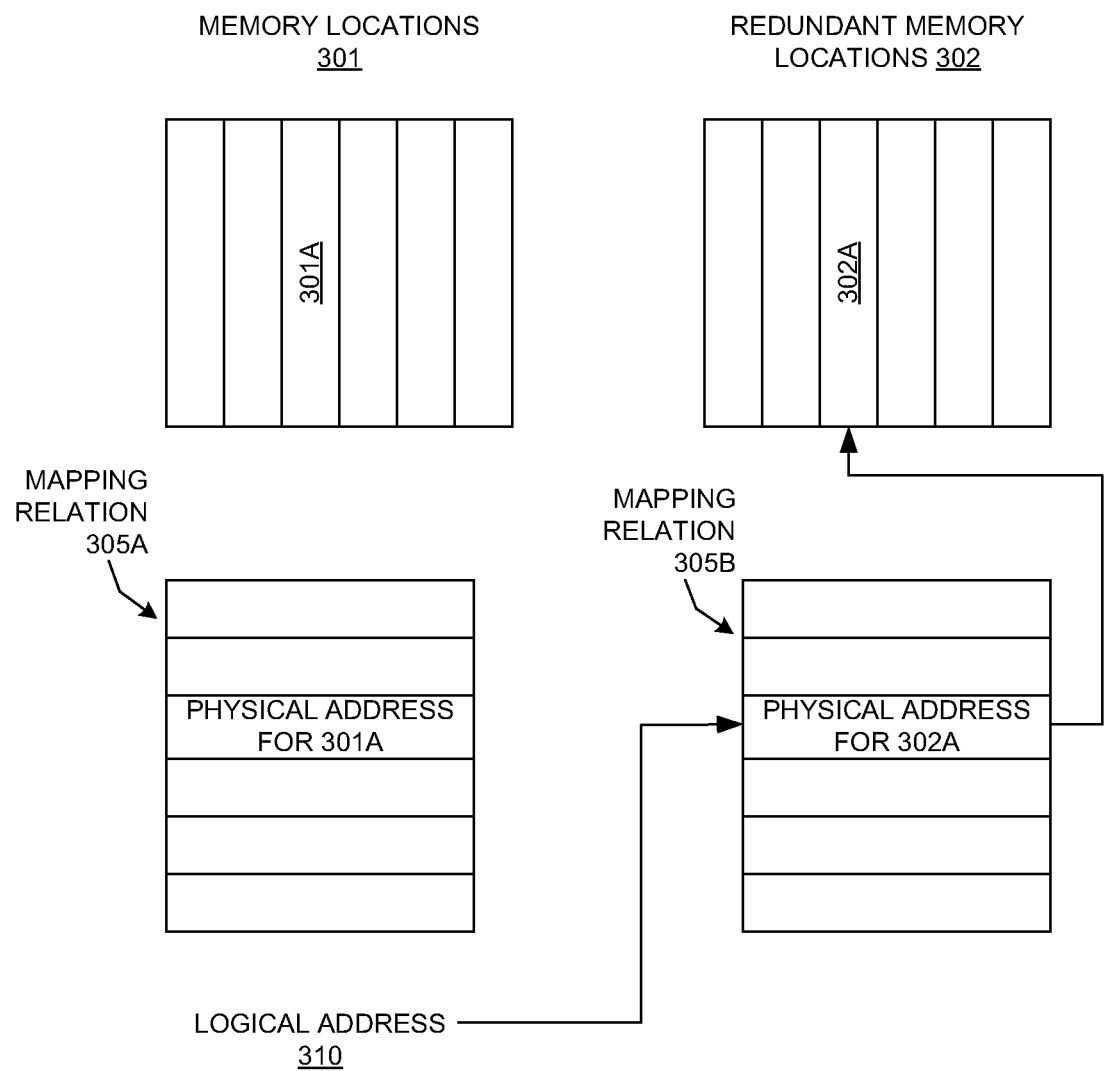

FIGS. 3A and 3B are block diagrams showing an example of online redundancy repair at the wordline or bitline level in an embodiment according to the present invention. To repair a wordline or bitline online in an embodiment according to the present invention, the memory controller 104 translates a logical address to a physical address for a memory location in the computer memory using the address decoder module 104A of the memory controller 104. The computer memory includes a memory module (e.g., a DIMM such as the memory module 106 of FIG. 1) that includes a number of memory chips, e.g., DRAM chips. The memory module includes memory locations 301 and redundant memory locations 302. The memory locations are represented in FIGS. 3A and 3B are rectangular columns; those columns can represent bitlines or wordlines, for example. However, embodiments according to the invention are not limited to bitline/wordline repair but can be applied to larger portions of computer memory such as banks, and so in general the memory locations 301 and redundant memory locations 302 can represent any logical or physical portion of computer memory such as channels, banks, ranks, rows, columns, and chips.

The address decoder module 104A uses a mapping relation or table 305A that identifies physical addresses of memory locations in the memory module 301 that can be used for the logical-to-physical address mapping. The redundant memory locations 302 have physical addresses that are not used in the mapping relation 305A; that is, there are physical addresses for the redundant memory locations but they are not used in the mapping but instead are held in reserve, so that a logical address is therefore not mapped to a physical address for a redundant memory location until that memory location is utilized for redundancy repair.

In the example of FIG. 3A, the logical address 310 is mapped to the memory location 301A based on the physical address for that memory location that is included in the mapping relation 305A. In response to information characterizing the first memory location (e.g., the memory location 301A) as faulty, the memory controller 104 uses the second memory location (e.g., the memory location 302A) in place of the first memory location. The memory controller 104 replaces the physical address for the memory location 301A in the mapping relation 305A with the physical address for the second memory location 302A. The updated mapping relation 305B (FIG. 3B) containing the physical address for the second memory location 302A is then used, so that the logical address 310 is subsequently mapped to the memory location 302A.

As just described, a second memory location 302A can be used in place of a first memory location 301A at the wordline and bitline level. However, the invention is not so limited. For example, instead of a wordline or bitline redundancy repair within a memory bank, a memory module can be manufactured with one or more redundant banks and a redundant bank can be used in place of another bank. For example, if the number of errors in a first bank exceeds a threshold level, then a redundant bank can be used in place of the first bank. Such an approach can be extended to other portions (logical and physical) of computer memory such as channels, banks, ranks, rows, columns, and chips.

Thus, online redundancy repair is advantageous because it is not necessary to take the memory module out of the computer system in order to accomplish the repair. Instead, the mapping relation is changed online with the memory module in place so that the memory module as well as the computer system remain available.

As mentioned above, embodiments according to the present disclosure also improve the fault tolerance of computer memory such as DIMMs through enhanced ECC with robust error correction capability. In an embodiment, an error correction coder/decoder (codec) performs ECC at least two times on data written to the computer memory and at least two times on data read from the computer memory. The ECC is performed one of those at least two times in the computer memory and another of those at least two times outside the computer memory.

Figure 4:
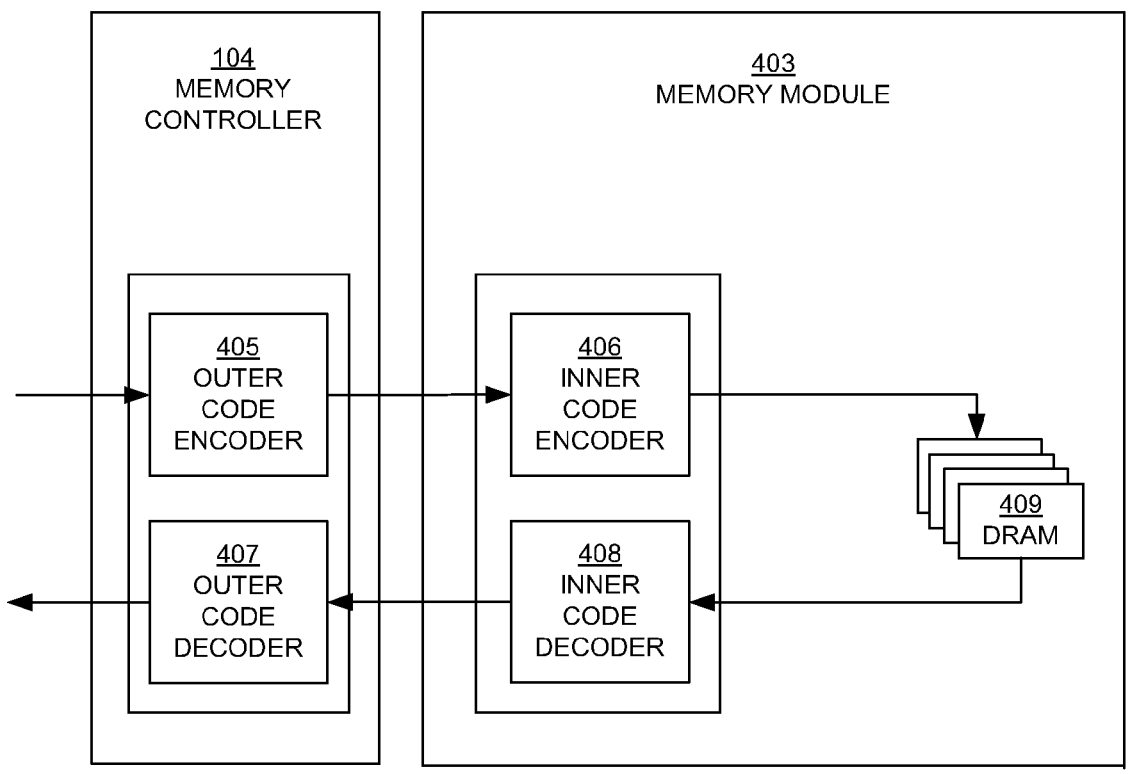
FIG. 4 is a block diagram illustrating error correction coding in an embodiment according to the present invention.

FIG. 4 is a block diagram illustrating ECC in an embodiment according to the present invention. The memory module 403 may be a DIMM such as the memory module 106 of FIG. 1. In the embodiment of FIG. 4, the outer code encoder 405 and inner code encoder 406 are used for ECC for data being written to the memory module 403; that is, ECC is performed twice for data being written to memory. Also, in the embodiment of FIG. 4, the inner code decoder 408 and outer code decoder 407 are used for ECC for data being read from the memory module 403; that is, ECC is performed twice for data being read from memory.

In an embodiment, the inner code encoder 406 and inner code decoder 408 are implemented on (embedded in) the memory module 403, while the outer code encoder 405 and outer code decoder 407 are implemented off (outside of) the memory module. In the embodiment of FIG. 4, the outer code encoder 405 and outer code decoder 407 are implemented by the memory controller 104.

The inner code encoder 406 and inner code decoder 408 interface directly with the memory cells, e.g., DRAM 409. The inner code encoder 406 and inner code decoder 408 are designed with high error correction capability.

Thus, another fold of ECC is used at the memory side to provide two-stage fault tolerance for improved performance. This two-stage fault tolerance configuration both reduces the bit error rate of data entering the CPU SOC 101 (FIG. 1) and enhances the signal-to-noise ratio of signals coming out of the memory module 403 without having to change the configuration of the CPU SOC. With the addition and strength of the inner code encoder 406 and inner code decoder 408, the uncorrectable error rate is low enough that conventional Hamming code is sufficient in the outer code encoder 405 and outer code decoder 407.

Figure 5A:
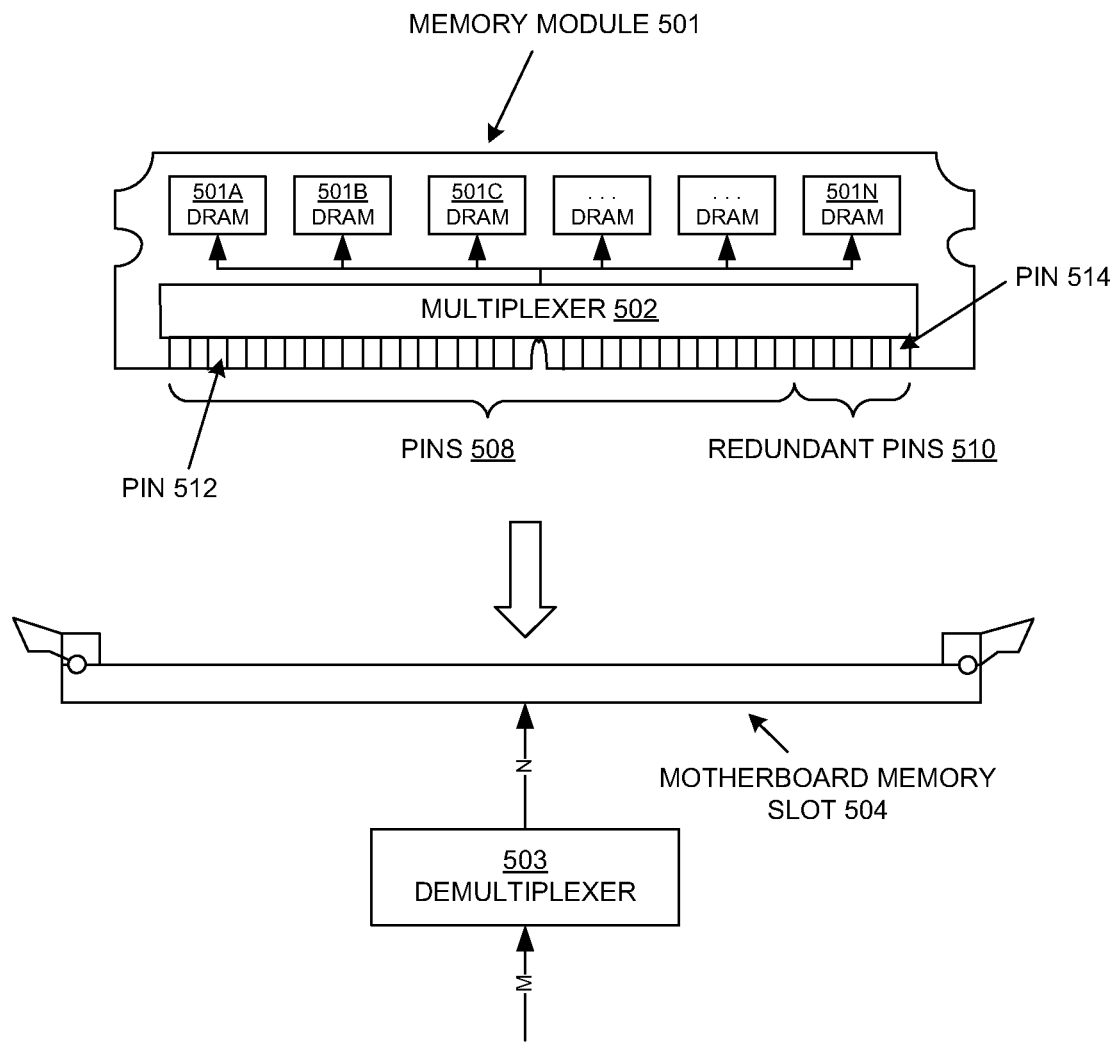
FIGS. 5A, 5B, and 5C illustrate pin remapping on a memory module in an embodiment according to the present invention.

As mentioned above, embodiments according to the present disclosure also improve the fault tolerance of computer memory such as DIMMs by dynamically remapping pins on a memory module to handle, for example, deterioration of the pins. FIG. 5A shows a motherboard memory slot 504 and a memory module 501 (e.g., the memory module 106 of FIG. 1) that can be slotted into the motherboard memory slot. The memory module 501 includes a number of DRAM chips 501A, 501B, 501C, . . . , 501N. The memory module 501 includes a first set of pins 508 and another set of redundant pins 510 in addition to the first set of pins. The pins 508 include data and address pins (bus and signal pins). The redundant pins 510 are extra pins that are not used except for redundancy repair. In an embodiment, there are 234 pins in the first set of pins 508 and 16 redundant pins 510, for a total of 250 pins.

In an embodiment, in operation, when the memory controller 104 identifies a first pin on the memory module 501 (e.g., the pin 512) that is characterized as defective, instead of routing an input to that pin, the memory controller 104 reroutes the input to the first pin to a second pin 514, where the second pin is one of the redundant pins 510 on the memory module 501. In an embodiment, an M-to-N demultiplexer 503 (M less than N) under control of the memory controller 104 is used to reroute the input to the second pin 514 instead of the first pin 512. In an embodiment, a multiplexer 502 on the memory module 501 and under control of the memory controller 104 is used to route an output from the second pin 514 to a destination (e.g., the memory chip 501A) on the memory module. This is illustrated further by way of the examples of FIGS. 5B and 5C.

Figure 5B:
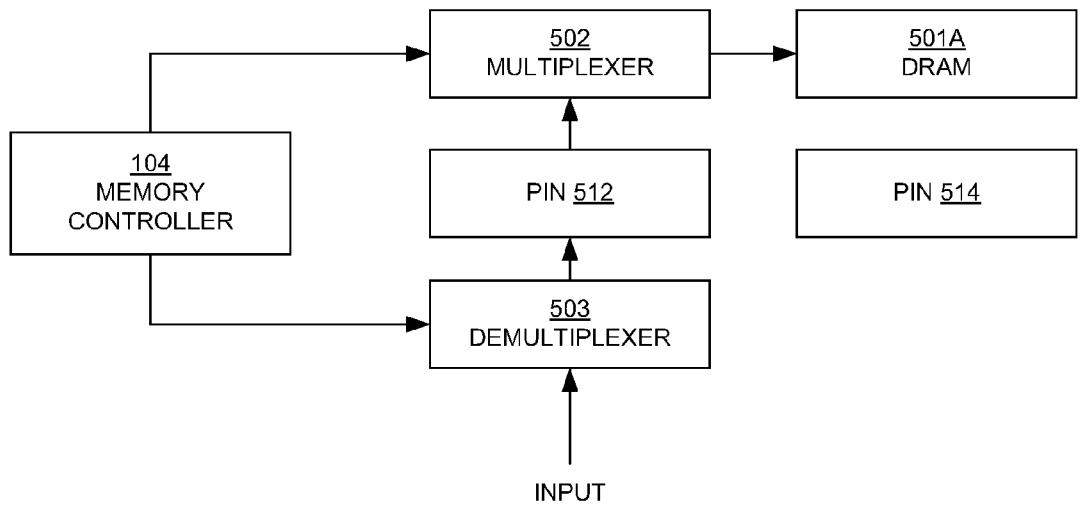
Figure 5C:
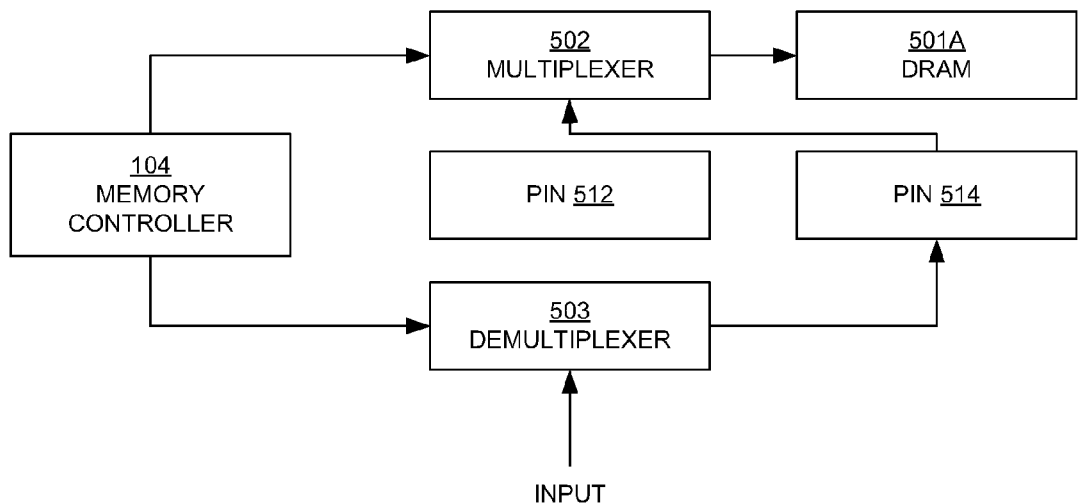

With reference first to FIG. 5B, an input to the first pin 512 is routed to the first pin 512 by the demultiplexer 503, and the output from the first pin 512 is routed to the memory chip 501A by the multiplexer 502. With reference to FIG. 5C, if the first pin 512 is no longer useful, then the input to the first pin 512 is rerouted by the demultiplexer 503 to the second pin 514 instead of to the first pin, and the output from the second pin 514 is routed by the multiplexer 502 to the memory chip 501A. The first pin 512 may no longer be useful for any number of reasons. For example, it may have deteriorated to a point where it has become unreliable, it may be damaged in some way, or the like. In general, a pin that is no longer useful is referred to herein as being characterized as defective or faulty.

In essence, if one of the pins 508 fails to be reliable, then one of the redundant pins 510 can be used to replace the failed/unreliable pin. For example, some of the pins 508 are used for data, and some of the pins 508 are used for address/control and commands. Each of the redundant pins 510 can be used to perform different functions. For example, a redundant pin 510 can be used for data or for address/control depending on what is mapped to it. In other words, if a data pin fails, its input can be mapped to a redundant pin; in this case, a redundant pin will be used as a data pin. If instead an address/control pin fails, its input can be mapped to a redundant pin; in that case, the redundant pin will be used as an address/control pin. Thus, a redundant pin can receive either a data or address/control input depending on which failed pin is mapped to it, and the multiplexer 502 can be used to route the information from the redundant pin to the proper destination on the memory module 501.

In the example embodiments of FIGS. 5A, 5B, and 5C, a demultiplexer is used to route an input from a first (e.g., failed) pin to a second, redundant pin, and a multiplexer is used to route an output from the second pin to a destination on the memory module (e.g., a memory chip connected to the first pin). However, the invention is not limited to the use of demultiplexers or multiplexers. Buses, switches, and buffers can be configured to route signals through the memory module, for example.

Although some of the embodiments discussed above use DIMMs in the discussion of memory modules, the memory modules could be other types of memory modules.

Figure 6:
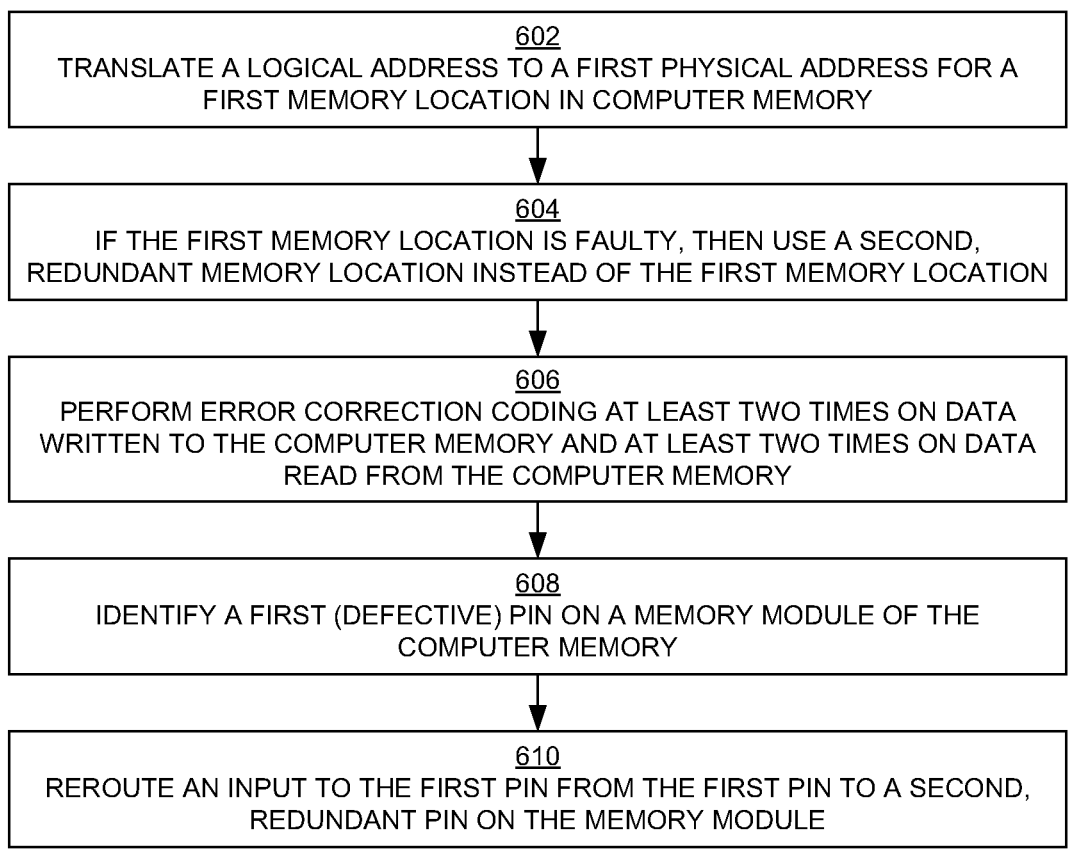
FIG. 6 illustrates a flowchart of a method of implementing fault tolerance in a computer memory, in an embodiment according to the present invention.

FIG. 6 is a flowchart 600 illustrating an example of a method of implementing fault tolerance in a computer memory, in an embodiment according to the present invention. In an embodiment, the computer memory includes one or more memory modules, each module including one or more memory chips. In such an embodiment, the memory module is a DIMM.

In block 602, a logical address is translated to a first physical address for a first memory location in the computer memory. The translation uses a mapping relation that identifies memory locations in the computer memory.

In block 604, a second memory location in the computer memory is used to store data instead of the first memory location in response to information characterizing the first memory location as faulty or defective. In an embodiment, the first memory location is characterized as faulty in response to detecting a threshold number of errors in the first memory location. The second memory location is selected from a redundant memory location. The first and second memory locations may be bitlines, wordlines, banks, ranks, channels, rows, columns, or chips.

In block 606, in an embodiment, ECC is performed at least two times on data written to the computer memory and at least two times on data read from the computer memory. The ECC is performed one of the at least two times in the computer memory and another of the at least two times outside the computer memory each time data is written to the computer memory and each time data is read from the computer memory. In an embodiment, the ECC is performed once in the computer memory (on the memory module) and once inside a CPU SOC that is coupled to the computer memory. In such an embodiment, the ECC can be performed in a memory controller on the CPU SOC.

In block 608, in an embodiment, a first pin that is characterized as defective is identified on a memory module of the computer memory. The memory module includes redundant pins.

In block 610, an input to the first pin is rerouted to one of the redundant pins (a second pin), and an output from the second pin is routed to a destination (e.g., a memory chip) on the memory module. In an embodiment, a demultiplexer is used to reroute the input from the first pin to the second pin, and a multiplexer is used to route the output from the second pin to the destination (e.g., the memory chip).

While the foregoing disclosure sets forth various methods using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various methods have been described and/or illustrated herein in the context of fully functional computing systems, one or more of these example methods may be distributed as a program product in a variety of forms, regardless of the particular type of computer-readable media used to actually carry out the distribution. The methods disclosed herein may also be implemented using software modules that perform certain tasks. These software modules may include script, batch, or other executable files that may be stored on a computer-readable storage medium or in a computing system. These software modules may configure a computing system to perform one or more of the example methods disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

Although the subject matter has been described in language specific to structural features and/or methodological acts, it is to be understood that the subject matter defined in the disclosure is not necessarily limited to the specific features or acts described above. Rather, the specific features and acts described above are disclosed as example forms of implementing the disclosure.

Embodiments according to the invention are thus described. While the present disclosure has been described in particular embodiments, it should be appreciated that the invention should not be construed as limited by such embodiments, but rather construed according to the following claims.

What is claimed is:

1. A method of implementing fault tolerance in a computer memory, wherein the computer memory comprises a memory module comprising a plurality of pins, the method comprising:

translating, with a memory controller, a logical address to a first physical address for a first memory location in the computer memory, said translating using a mapping relation that identifies memory locations in the computer memory, wherein the computer memory comprises redundant memory locations;

storing data in a second memory location in the computer memory in response to information characterizing the first memory location as faulty, the second memory location selected from the redundant memory locations;

replacing the first physical address in the mapping relation with a second physical address for the second memory location;

identifying, with the memory controller, a first pin of the plurality of pins that is characterized as defective;

rerouting an input to the first pin to a second pin using a demultiplexer external to the memory module, the second pin included in the redundant pins on the memory module; and routing an output from the second pin to a destination on the memory module using a multiplexer on the memory module.

2. The method of claim 1, wherein the memory module comprises a plurality of memory chips, and wherein the memory module comprises a dual in-line memory module.

3. The method of claim 1, wherein the first memory location, the second memory location, and the redundant memory locations are each selected from the group consisting of a row, wordline, column, bitline, bank, chip, rank, and channel.

4. The method of claim 1, wherein the first memory location is characterized as faulty in response to detecting a threshold number of errors in the first memory location.

5. The method of claim 1, further comprising performing error correction coding (ECC) at least two times on data written to the computer memory and at least two times on data read from the computer memory, wherein the ECC is performed in the computer memory and outside the computer memory.

6. A method of implementing fault tolerance for a memory module comprising a first plurality of pins and a second plurality of redundant pins in addition to the first plurality of pins, the method comprising:
   identifying, with a memory controller, a first pin of the first plurality of pins characterized as defective;
   routing an input to the first pin to a second pin instead of to the first pin, the second pin included in the redundant pins on the module; and
   routing an output from the second pin to a destination on the memory module, said routing an output comprising using a multiplexer on the memory module to route the output from the second pin to the destination.

7. The method of claim 6, further comprising performing error correction coding (ECC) at least two times on data written to the memory module and at least two times on data read from the memory module, wherein the ECC is performed on the memory module and is performed outside the memory module.

8. The method of claim 6, further comprising using a demultiplexer to reroute the input from the first pin to the second pin.

9. The method of claim 6, further comprising:
   translating, with the memory controller, a logical address to a first physical address for a first memory location in the memory module, said translating using a mapping relation that identifies memory locations in the memory module, wherein the memory module comprises redundant memory locations;
   storing data in a second memory location in the memory module in response to information characterizing the first memory location as faulty, the second memory location selected from the redundant memory locations; and
   replacing the first physical address in the mapping relation with a second physical address for the second memory location.

10. The method of claim 9, wherein the first memory location, the second memory location, and the redundant memory locations are each selected from the group consisting of a row, wordline, column, bitline, bank, chip, rank, and channel.

11. The method of claim 9, wherein the first memory location is characterized as faulty in response to detecting a threshold number of errors in the first memory location.

12. The method of claim 6, wherein the memory module comprises a dual in-line memory module.

13. The method of claim 6, wherein the multiplexer on the memory module is under control of the memory controller.

14. A computer system, comprising:
a processor;
a memory coupled to the processor, wherein the memory comprises a memory module comprising a plurality of pins and redundant pins in addition to the plurality of pins;
a memory controller coupled to the processor and to the memory;
   the memory controller operable to translate a logical address to a first physical address for a first memory location in the memory, wherein the memory controller uses a mapping relation that identifies memory locations in the memory and wherein the memory comprises redundant memory locations;
   the memory controller operable to store data in a second memory location in the memory in response to information characterizing the first memory location as faulty, the second memory location selected from the redundant memory locations;
   the memory controller operable to replace the first physical address in the mapping relation with a second physical address for the second memory location; and
   the memory controller operable to identify a first pin of the plurality of pins that is characterized as defective and to reroute an input to the first pin from the first pin to a second pin included in the redundant pins, wherein an output from the second pin is routed to a memory chip on the memory module;
a demultiplexer coupled to the memory module and configured to reroute the input to the first pin from the first pin to the second pin; and
a multiplexer on the memory module and configured to route an output from the second pin to the memory chip.

15. The computer system of claim 14, wherein the memory module comprises a plurality of memory chips, and wherein the memory module comprises a dual in-line memory module.

16. The computer system of claim 14, wherein the first memory location, the second memory location, and the redundant memory locations are each selected from the group consisting of a row, wordline, column, bitline, bank, chip, rank, and channel; wherein further the first memory location is characterized as faulty in response to detecting a threshold number of errors in the first memory location.

17. The computer system of claim 14, wherein the multiplexer on the memory module is under control of the memory controller.

18. The computer system of claim 14, wherein the memory controller is further operable to perform error correction coding (ECC) at least two times on data written to the memory and on data read from the memory, and wherein the ECC is performed in the memory and is performed outside the memory.

* * * * *